(12) United States Patent
Foering et al.

(10) Patent No.: US 6,260,891 B1
(45) Date of Patent: Jul. 17, 2001

(54) PRESS-FITTING FOR NON REMOVABLE TUBE COUPLING

(75) Inventors: Herbert Foering, Solingen; Rainer Franzen, Krefeld; Thomas Gigowski, Grevenbroich, all of (DE)

(73) Assignee: Mannesmann AG, Düsseldorf (DE)

( * ) Notice: Subject to any disclaimer, the term of this patent is extended or adjusted under 35 U.S.C. 154(b) by 0 days.

(21) Appl. No.: 09/424,806

(22) PCT Filed: Apr. 28, 1998

(86) PCT No.: PCT/DE98/01248

§ 371 Date: Nov. 29, 1999

§ 102(e) Date: Nov. 29, 1999

(87) PCT Pub. No.: WO98/54500

PCT Pub. Date: Dec. 3, 1998

(30) Foreign Application Priority Data

May 27, 1997 (DE) ............................................ 197 22 935

(51) Int. Cl.$^7$ .................................................... F16L 13/14
(52) U.S. Cl. ........................ 285/382.2; 285/910; 285/918; 285/328
(58) Field of Search ................................ 285/382, 382.1, 285/382.2, 918, 910, 328

(56) References Cited

U.S. PATENT DOCUMENTS 4,880,260 * 11/1989 Gotoh et al. ...................... 285/382.2
5,007,667 * 4/1991 Unewisse ........................... 285/382.2
5,730,476 * 3/1998 Gouda ................................ 285/382
6,049,962 * 4/2000 Pleiffer .............................. 285/382.2

FOREIGN PATENT DOCUMENTS

| 1236874 | * | 3/1967 | (DE) | ................... | 285/918 |
| 1273280 | * | 7/1968 | (DE) | ................... | 285/918 |
| 1945362 | * | 3/1970 | (DE) | ................... | 285/382.2 |
| 2350265 | * | 5/1974 | (DE) | ................... | 285/382 |
| 2814700 | * | 10/1979 | (DE) | ................... | 285/382 |
| 92990 | * | 6/1962 | (DK) | ................... | 285/918 |
| 180398 | * | 7/1990 | (JP) | ................... | 285/382.2 |

* cited by examiner

*Primary Examiner*—Eric K. Nicholson
(74) *Attorney, Agent, or Firm*—Cohen, Pontani, Lieberman & Pavane

(57) ABSTRACT

A press fitting for producing a nondetachable tight connection of smooth-ended pipes which has at least one portion receiving a toroidal sealing element and an adjoining cylindrical area extending in the longitudinal direction, and is provided with a shoulder acting as a stop for the pipe which can be pushed in or pushed on. The sealing element has, in the circumferential direction, at least one portion which is provided with a cross section diverging from the starting cross section in that a bulge extends along the circumference and along the cross-sectional plane and a recess facing the pushed in pipe extends radially in the cross section of the sealing element, the volume of the bulge compared with the starting cross section is at least equal to the volume of the recess lacking at the starting cross section and, before pressing, the recess of the sealing element forms a through-opening in the axial direction viewed in cross section.

7 Claims, 4 Drawing Sheets

Schnitt A-B

Ansicht Z

Ansicht Y

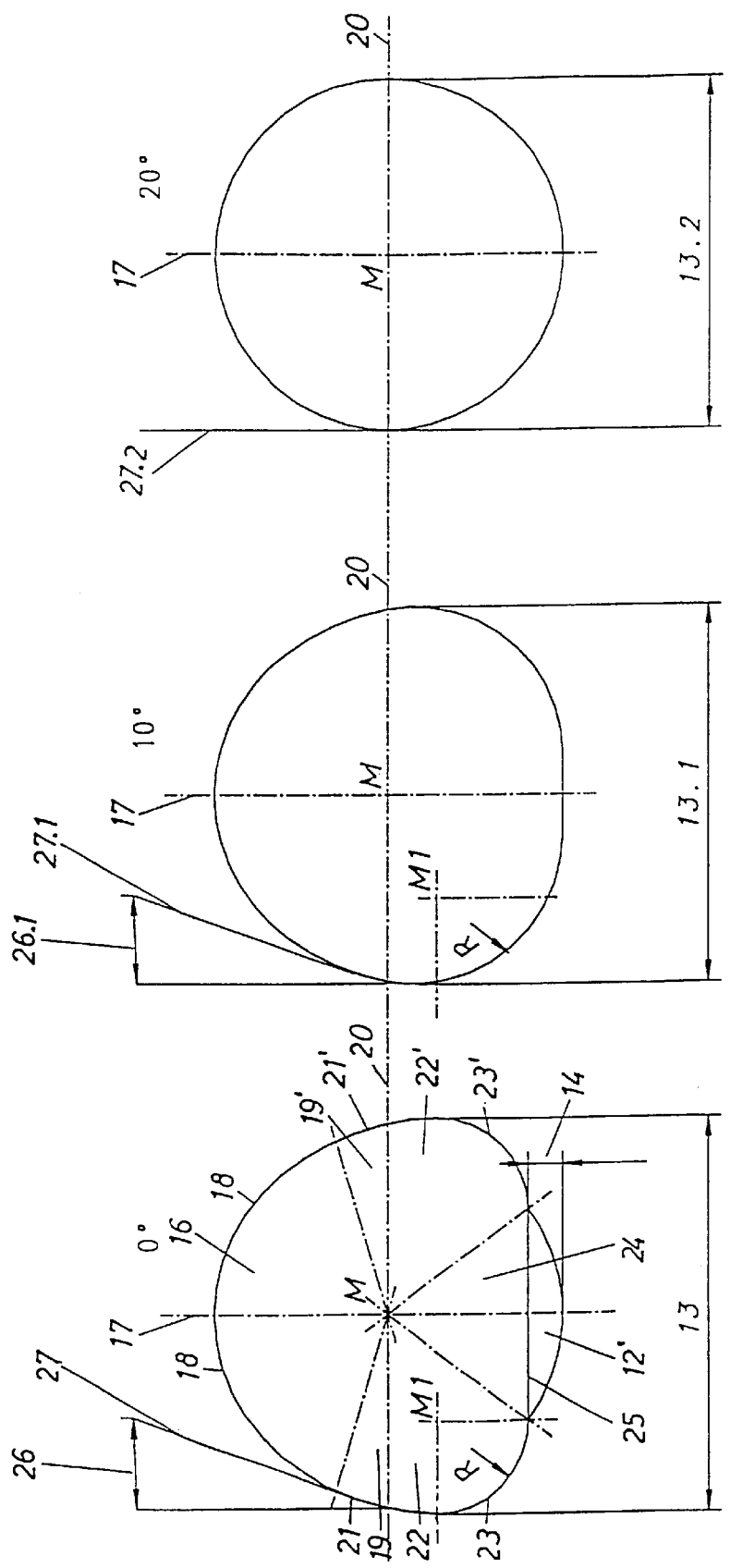

PRESS-FITTING FOR NON REMOVABLE TUBE COUPLING

BACKGROUND OF THE INVENTION

1. Field of the Invention

The invention is directed to a press fitting for producing a permanent or nondetachable tight connection of smooth-ended pipes.

2. Discussion of the Prior Art

It is known (see brochure: Mannesmann Preβfitting GmbH, Release 8/1994) to produce a nondetachable tight connection of smooth-ended pipes with a fitting which engages around the smooth ends of the pipes and each of whose bead-shaped ends receives a sealing ring. The bead-shaped end and, at the same time, the adjacent cylindrical area of the fitting are deformed together with the pipe plastically and with the enclosed sealing ring elastically by means of an exchangeable holding device with articulated jaws which is connected with an actuating device. The sealing function of the connection is achieved in that the sealing ring is elastically deformed by the plastic deformation of the bead-shaped end of the press fitting and, along a defined portion of the cross-sectional circumference, linearly contacts the surrounding surface areas of the bead-shaped end of the fitting and of the pipe. In order to absorb the longitudinal forces occurring at a corresponding internal pressure, the cylindrical area of the fitting adjacent to the bead-shaped end is plastically deformed together with the pipe. Both the bead-shaped end and the adjacent cylindrical area are deformed simultaneously by means of the actuating device during pressing.

As a rule, a connection point that is not pressed leads to detectable leakage in the pressure test which must be carried out according to regulations following installation. However, in special cases, it may happen that the tolerance matching of the pipe and fitting is so unfavorable that, when the smooth-ended pipe is pushed in, the sealing ring undergoes a pre-deformation which, although only slight, is sufficient to withstand the pressure test during inspection of the installation. However, when the line breathes in subsequent operation, i.e., fast-switching valves lead to water hammers or pressure shocks, relative movements can come about depending on heating, so that, in the absence of axial securing when there is no pressing, the previously resulting slight pre-deformation of the sealing ring is not sufficient to further ensure the tightness of the connection point.

SUMMARY OF THE INVENTION

It is the object of the present invention to provide a press fitting for producing a nondetachable tight connection of smooth-ended pipes by which a location which is not pressed is detected as leaky, also in case of an unfavorable tolerance matching of pipe and fitting.

According to the invention, the sealing element has, in the circumferential direction, at least one portion which is provided with a cross section deviating from the starting cross section in that a bulge extends along the circumference and along the cross-sectional plane and a recess facing the pushed in pipe extends radially in the cross section of the sealing element. In order for the recess to be completely filled after pressing, the volume of the bulge compared with the starting cross section is at least equal to the volume of the recess lacking at the starting cross section. Before pressing, the recess of the sealing element forms a through-opening in the axial direction viewed in cross section. The sealing element is preferably constructed as a torus with a circular cross section. In order to prevent unwanted creasing and pinching of the sealing element during the pressing and displacement of the volume of the bulge into the negative volume of the recess, the portion with the diverging cross section passes continuously without interruptions into the starting cross section along a predetermined circumferential extension in both directions.

The sealing element preferably has three portions which are arranged so as to be symmetrically distributed along the circumference with a cross section diverging from the starting cross section. Viewed in cross section, the above-mentioned portion is pear-shaped, wherein, in the transitional area, the pear shape increasingly approximates the circular shape and the flattened portion below becomes steadily smaller. The suggested construction of the sealing element has the advantage that even in case of extreme tolerance matching of the pipe and fitting the slight pre-deformation of the sealing element is not sufficient to press the deliberately arranged recesses closed in a sealing manner. This means that when a connection of a sealing element of this type is not pressed, leaking will definitely result during the pressure test. A connection point of this kind can then be pressed subsequently and the pressure test can be repeated. The pear shape ensures that the absent volume in the recess is completely filled again by the pressing of the bulge, and the sealing element tightly contacts the contact face oriented toward the pipe and the magnitude of pretensioning is so selected that tightness is retained even after a long period of operation.

The construction of the sealing element according to the invention is described more fully in the drawing with reference to an example.

BRIEF DESCRIPTION OF THE DRAWINGS

FIGS. 7a–c show different sections according to FIG. 6 for a circumferential extension of 0°, 10° and 20°.

DETAILED DESCRIPTION OF THE PREFERRED EMBODIMENTS

Figure 1:
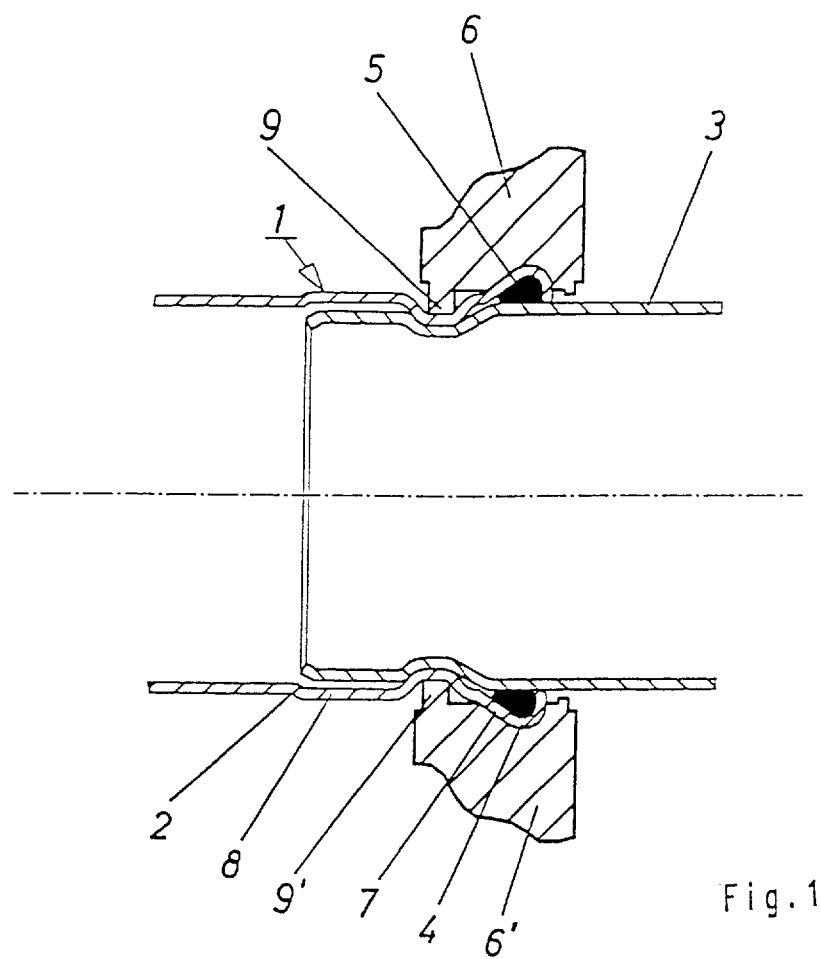
FIG. 1 shows a longitudinal section through a pressed connection.

FIG. 1 shows a pressed connection in longitudinal section. The press fitting 1 has a stop 2, up to which the pipe 3 must be pressed in so as to ensure a flawless pressing. A torodial sealing element 5, having the form of a sealing ring in the present case, is arranged in bead-shaped area 4 of the press fitting 1. This sealing element 5 is elastically deformed by the applied pressing jaws 6, 6' and fills up the entire chamber space formed by the bead-shaped area 4. The bead-shaped area 4 passes over a sloping area 7 into a cylindrical area 8. The press fitting 1 is plastically deformed in this cylindrical area 8 by the pressing ridges 9, 9' of the pressing jaws 6, 6', as is the area of the pushed in pipe 3 located beneath it. The contour of this pressing ridge 9, 9' is hexagonal, square or lemon-shaped, viewed in the circumferential direction.

Figure 2:
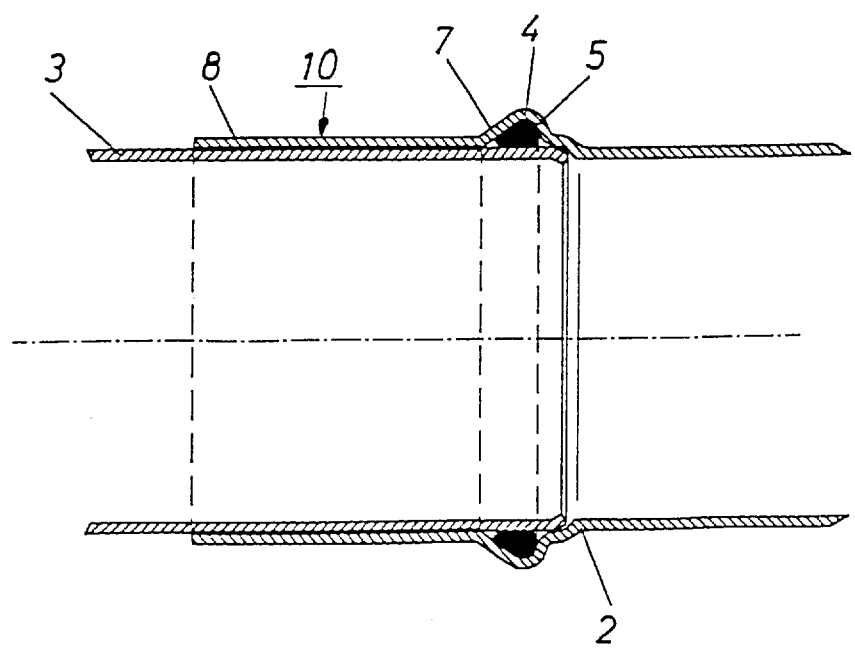
FIG. 2 shows a longitudinal section through another embodiment prior to pressing.

FIG. 2 shows another type of press fitting, wherein identical parts are designated by the same reference numbers. This press fitting 10 differs in that it likewise has, on the open side, an area 7 which extends at an inclination and then, in a rounded manner, passes into the cylindrical area 8. In contrast to the embodiment shown in FIG. 1, the cylindrical area 8 is arranged in front of the sealing element 5 viewed in the push-in direction, and not behind the sealing element 5.

Figure 3:
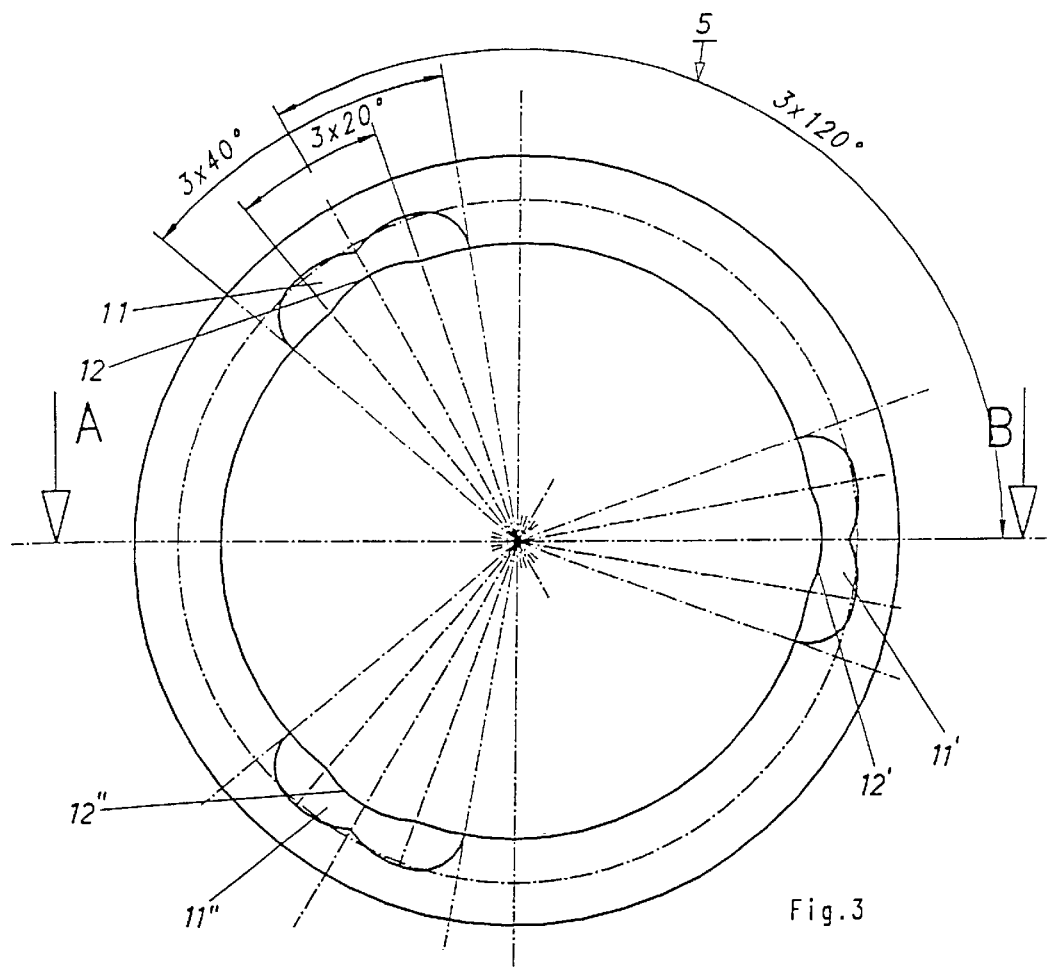
FIG. 3 shows a front view of a sealing element constructed according to the invention.
Figure 4:
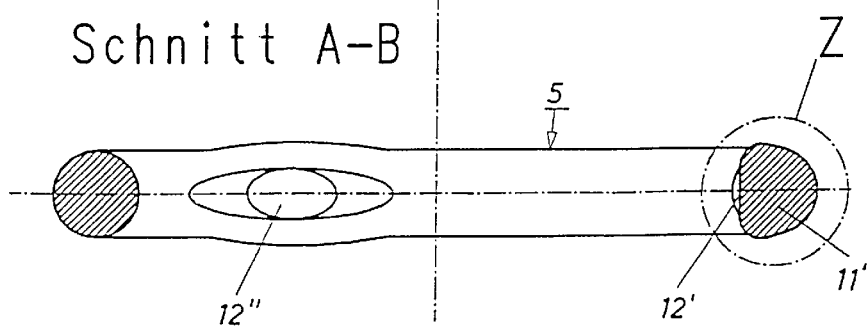
FIG. 4 shows a section A–B from FIG. 3.

A first embodiment the sealing element 5 constructed in accordance with the invention is shown in a front view in FIG. 3. In this embodiment, the sealing element 5 is provided with three portions 11, 11', 11" which are arranged so as to be distributed symmetrically along the circumference and which, as can be seen from FIG. 4, have a bulge which diverges from the circular shape. However, said portions 11, 11', 11" are also characterized in that they have a lens-shaped recess 12, 12', 12" which faces the pushed in pipe 3 (FIGS. 1, 2) and which extends radially in the cross section of the sealing element 5. The lens shape is clearly shown in FIG. 4. Details in this regard are described with reference to the following Figures. In this embodiment, the portions 11, 11', 11" provided with the divergent cross section extend along a circumference of 40° in each instance, wherein the recess 12, 12', 12" extends only over half of this circumference at 20°.

Figure 5:
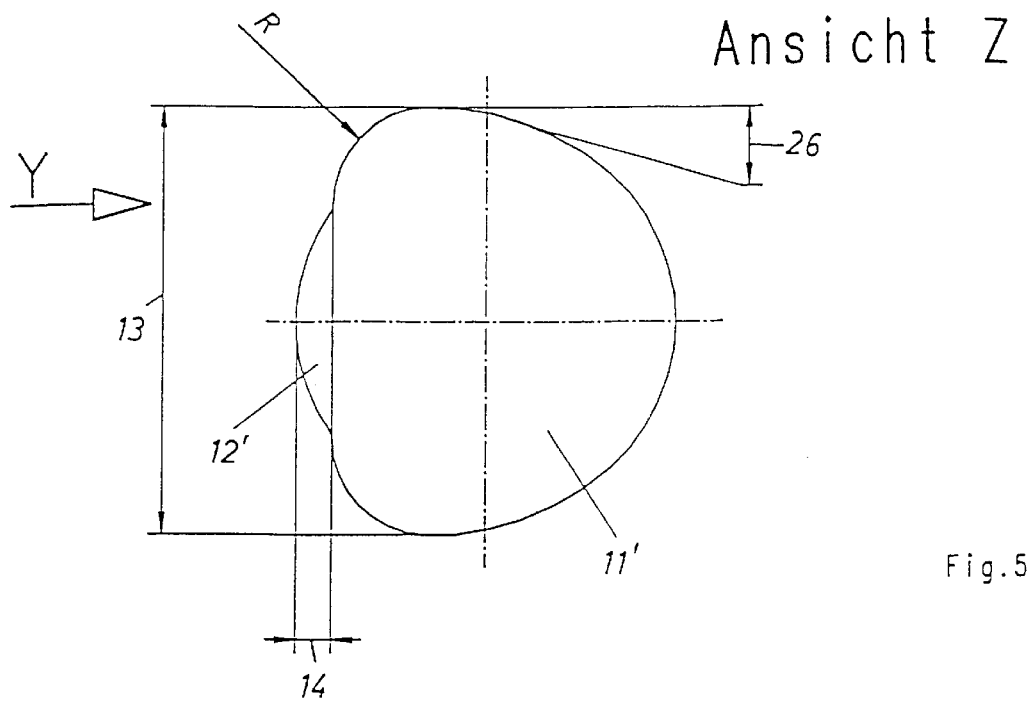
FIG. 5 shows a view Z from FIG. 4.
Figure 6:
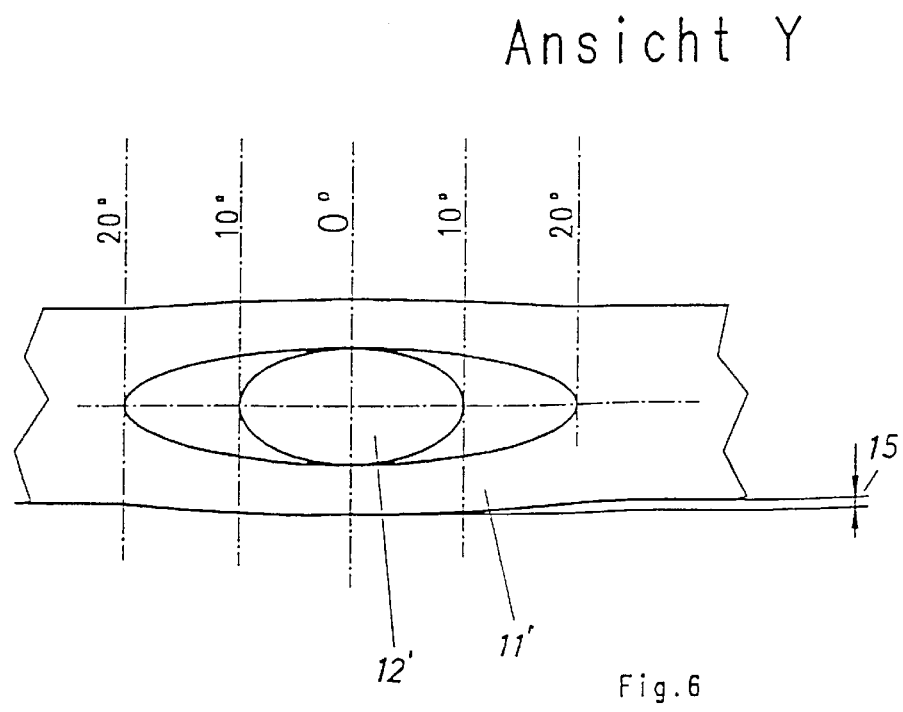
FIG. 6 shows a view Y from FIG. 5.

FIG. 5 shows that the cross section located exactly in the center of portion 11' with respect to this Figure is pear-shaped, wherein the outer contour is alternately curved and straight. An essential characteristic of this cross section is the bulge which has its greatest extension 13 at the circumferential point at 0°. Also of importance is the depth 14 of the recess 12", wherein the ratios are selected so that the missing volume due to the recess 12" is at least replaced, with respect to the ideal circular cross section, by the volume resulting from the bulge. The change in the bulge in the circumferential direction is shown in FIG. 6. The jump from the largest dimension at the 0-degree circumferential location to the smallest dimension at >20° on the circumference is characterized by the extension dimension 15.

FIG. 7 shows details of the cross section for an optional portion 11' in three selected sections according to FIG. 6. The cross section at 0° (FIG. 7a), i.e., the center of portion 11', is characterized by a first sector 16 which extends symmetrically from the vertical center axis 17 toward both sides. The outer contour 18 of this first sector 16 is circular, its center point being identical to the center point M of the sealing element. This sector 16 is adjoined on the right-hand and left-hand side by a second sector 19, 19', respectively, which terminates almost at the horizontally extending center axis 20 in this embodiment. Depending on the arrangement, however, the end of the circumferential extension of this second sector 19, 19' can also be located above or below the horizontally extending center axis 20. The outer contour 21, 21' of this second sector 19, 19' extends along a straight line. Two third sectors 22, 22' with an annular outer contour 23, 23' follow below the horizontally extending center axis 20. The center point M1 is eccentric to the center point M of the sealing element within the third sectors 22, 22' in both cases. A fourth sector 24 which has a straight-line contour 25 and extends symmetric to the vertical center axis 17 forms the lower fourth termination. It should also be noted that the straight-line contour 25 of the lower sector 24 and the straight-line contour 21, 21' of the two second sectors 19, 19' located above the horizontal center axis 20 form tangents to the circular contour 23 of the two third sectors 22, 22' located below the horizontal center axis 20. The extent of the bulge 13 is essentially determined by the depth 14 of the recess 12' and by the degree 26 of inclination 27 of the above-mentioned contour 21, 21' of the two second sectors 19, 19' located above the horizontally extending center axis 20.

FIG. 7b shows the transition to the circular cross section according to FIG. 7c. On the one hand, the degree of the bulge 13.1 is reduced until reaching the diameter 13.2 of the circular cross section. On the other hand, the degree 26.1 of inclination 27.1 is reduced until it forms the tangent 27.2 of the circular cross section extending vertical to the horizontal center axis 20.

What is claimed is:

1. A press fitting for producing a nondetachable tight connection of smooth-ended pipes, consisting essentially of:
   a toroidal sealing element;
   at least one portion receiving the toroidal sealing element; and
   an adjoining cylindrical area extending in a longitudinal direction, and having a shoulder formed as a stop for a pipe which can be pushed in, the sealing element having, in a circumferential direction, at least one portion with a cross section that diverges from a starting cross section of the sealing element so that a substantially axially projecting bulge extends along the circumference and along the cross-sectional plane, and a recess facing the pushed in pipe extends radially in the cross section of the sealing element, the bulge having a volume compared with the starting cross section of the sealing element that is at least equal to a volume of the recess in the starting cross section of the sealing element and, the recess of the sealing element being configured to form a through-opening in the axial direction viewed in cross section of the sealing element in an unstressed state.

2. A press fitting according to claim 1, wherein the sealing element is constructed as a torus with a circular cross section.

3. A press fitting according to claim 1, wherein the sealing element has three portions which are arranged so as to be symmetrically distributed along the circumference and with a diverging cross section.

4. A press fitting according to claim 1, wherein the portion with the diverging cross section passes continuously without interruptions into the starting cross section along a predetermined circumferential extension in both directions.

5. A press fitting according to claim 1, wherein the recess extends along 20° of the circumference and the entire portion extends along 40° of the circumference.

6. A press fitting according to claim 1, wherein the diverging cross section is pear-shaped with a first sector which extend above a horizontal center axis and symmetric to a vertical center axis and which has a circular contour whose center point is identical to a center point of the sealing element, adjoining each side of the first sector is a second sector, respectively, which extends approximately up to the horizontally extending center axis with a straight-line contour extending at an angle, a portion of the sealing element is located below the horizontal center axis and is formed of two third sectors which are symmetric to the vertical center axis and have a circular contour whose center point is offset in a twofold manner relative to the center point of the sealing element inside the respective third sector, and a fourth sector which is symmetric to the vertical center axis and has a straight-line contour that forms a lower termination, the straight-line contour of the fourth sector and the straight-line contour of the two second sectors above the horizontal center axis forming tangents to the circular contour of the two third sectors located below the horizontal center axis.

7. A press fitting according to claim 6, wherein the extension of the bulge of the portion having a divergent cross section, which bulge is oriented symmetrically below the horizontally extending center axis, and a depth of the recess in a transitional area decrease in a continuous manner, and the diagonally extending straight-line contour of the two second sectors located above the horizontally extending center axis extends in an increasingly steeper manner until the inclination of the contour forms a tangent to the circular cross section.

* * * * *